United States Patent
Garska

(10) Patent No.: US 8,894,127 B2
(45) Date of Patent: Nov. 25, 2014

(54) PICKUP TRUCK BED TONNEAU COVER SUPPORT STRUCTURE AND METHOD

(75) Inventor: Bradley R. Garska, Saline, MI (US)

(73) Assignee: Specialty Vehicle Acquisition Corporation, Warren, MI (US)

( * ) Notice: Subject to any disclaimer, the term of this patent is extended or adjusted under 35 U.S.C. 154(b) by 71 days.

(21) Appl. No.: 13/538,240

(22) Filed: Jun. 29, 2012

(65) Prior Publication Data

US 2013/0341960 A1 Dec. 26, 2013

Related U.S. Application Data

(60) Provisional application No. 61/663,298, filed on Jun. 22, 2012.

(51) Int. Cl.
*B60P 7/04* (2006.01)

(52) U.S. Cl.
USPC ............ 296/100.18; 296/100.15; 296/100.16

(58) Field of Classification Search
CPC ................ B60P 7/00; B60P 7/02; B60P 7/04
USPC ............................ 296/100.01, 100.15–100.18
See application file for complete search history.

(56) References Cited

U.S. PATENT DOCUMENTS

| | | | |
|---|---|---|---|
| 4,221,423 A | | 9/1980 | Stone |
| 4,747,441 A | | 5/1988 | Apolzer et al. |
| 4,923,240 A | * | 5/1990 | Swanson .................. 296/100.18 |
| 5,152,574 A | * | 10/1992 | Tucker ..................... 296/100.18 |
| 5,207,262 A | * | 5/1993 | Rushford ..................... 160/354 |
| 5,427,428 A | | 6/1995 | Ericson et al. |
| 5,460,423 A | * | 10/1995 | Kersting et al. .......... 296/100.18 |
| 5,522,635 A | * | 6/1996 | Downey .................... 296/100.16 |
| 5,526,866 A | * | 6/1996 | Flentge ......................... 160/380 |
| 5,553,652 A | * | 9/1996 | Rushford ...................... 160/354 |
| 5,636,893 A | | 6/1997 | Wheatley et al. |
| 5,688,087 A | * | 11/1997 | Stapleton et al. ............. 410/150 |
| 5,788,315 A | * | 8/1998 | Tucker ..................... 296/100.16 |
| 5,934,735 A | * | 8/1999 | Wheatley ................. 296/100.01 |
| 5,984,400 A | * | 11/1999 | Miller et al. ............. 296/100.15 |
| 6,024,402 A | * | 2/2000 | Wheatley ................. 296/100.18 |
| 6,053,558 A | * | 4/2000 | Weldy et al. ............. 296/100.17 |
| 6,126,226 A | * | 10/2000 | Wheatley ................. 296/100.17 |
| 6,238,153 B1 | * | 5/2001 | Karrer ........................... 410/102 |
| 6,257,306 B1 | * | 7/2001 | Weldy ........................... 160/327 |
| 6,386,616 B1 | * | 5/2002 | Wheatley ................. 296/100.16 |
| 6,669,264 B1 | * | 12/2003 | Tucker ..................... 296/100.15 |
| 6,752,449 B1 | | 6/2004 | Wheatley |
| 6,808,221 B2 | | 10/2004 | Wheatley |
| 6,893,073 B2 | | 5/2005 | Wheatley |

(Continued)

*Primary Examiner* — Gregory Blankenship

(74) *Attorney, Agent, or Firm* — Harness, Dickey & Pierce, P.L.C.

(57) ABSTRACT

Pickup truck bed tonneau covers and varieties thereof are manufactured using universal components. An outer frame is made from rails cut from universal rail stock. Universal, adjustable corner brackets can be fixed into a desired position to accommodate all different angles at the corners of the tonneau cover. Intermediate cross car rails are cut from universal rail stock and all are coupled to the outer frame via universal intermediate rail brackets. Opposing pairs of universal hinge brackets are used for all hinges of the tonneau cover. Thus, the tooling required to make a variety of tonneau covers is greatly reduced. An elongated step is adjacent to, and protrudes downwardly beyond, a seal coupling channel with a compressible seal extends along the outer frame. The downwardly protruding elongated step member acts as a continuous elongated stop, limiting compression of the seal member.

33 Claims, 11 Drawing Sheets

(56) References Cited

U.S. PATENT DOCUMENTS

| | | |
|---|---|---|
| 6,948,760 B2 | 9/2005 | Marx et al. |
| 6,948,761 B2 * | 9/2005 | Haack et al. ............. 296/100.18 |
| 7,004,530 B2 | 2/2006 | Marx et al. |
| 7,021,693 B2 | 4/2006 | Keller |
| 7,051,781 B2 | 5/2006 | Grimm et al. |
| 7,066,523 B2 | 6/2006 | Verduci et al. |
| 7,114,769 B2 | 10/2006 | Storc et al. |
| 7,163,260 B2 | 1/2007 | Reitzloff et al. |
| 7,188,888 B2 * | 3/2007 | Wheatley et al. ........ 296/100.04 |
| 7,303,227 B2 | 12/2007 | Reitzloff et al. |
| 7,334,830 B2 | 2/2008 | Weldy |
| 7,399,030 B2 | 7/2008 | Reitzloff et al. |
| RE41,078 E | 1/2010 | Schmeichel |
| 7,938,483 B2 | 5/2011 | Reitzloff et al. |
| 7,963,585 B2 * | 6/2011 | Jones et al. .............. 296/136.03 |
| 8,061,758 B2 | 11/2011 | Maimin et al. |
| 8,511,736 B2 * | 8/2013 | Williamson et al. ..... 296/100.07 |
| 8,657,358 B2 * | 2/2014 | Garska .................... 296/100.09 |
| 8,702,151 B2 * | 4/2014 | Mayfield et al. ......... 296/100.18 |
| 8,777,293 B2 * | 7/2014 | Garska .................... 296/100.15 |
| 8,807,624 B2 * | 8/2014 | Garska .................... 296/100.06 |
| 8,807,625 B2 * | 8/2014 | Garska .................... 296/100.07 |
| 2008/0129077 A1 * | 6/2008 | Weldy .................... 296/136.03 |

* cited by examiner

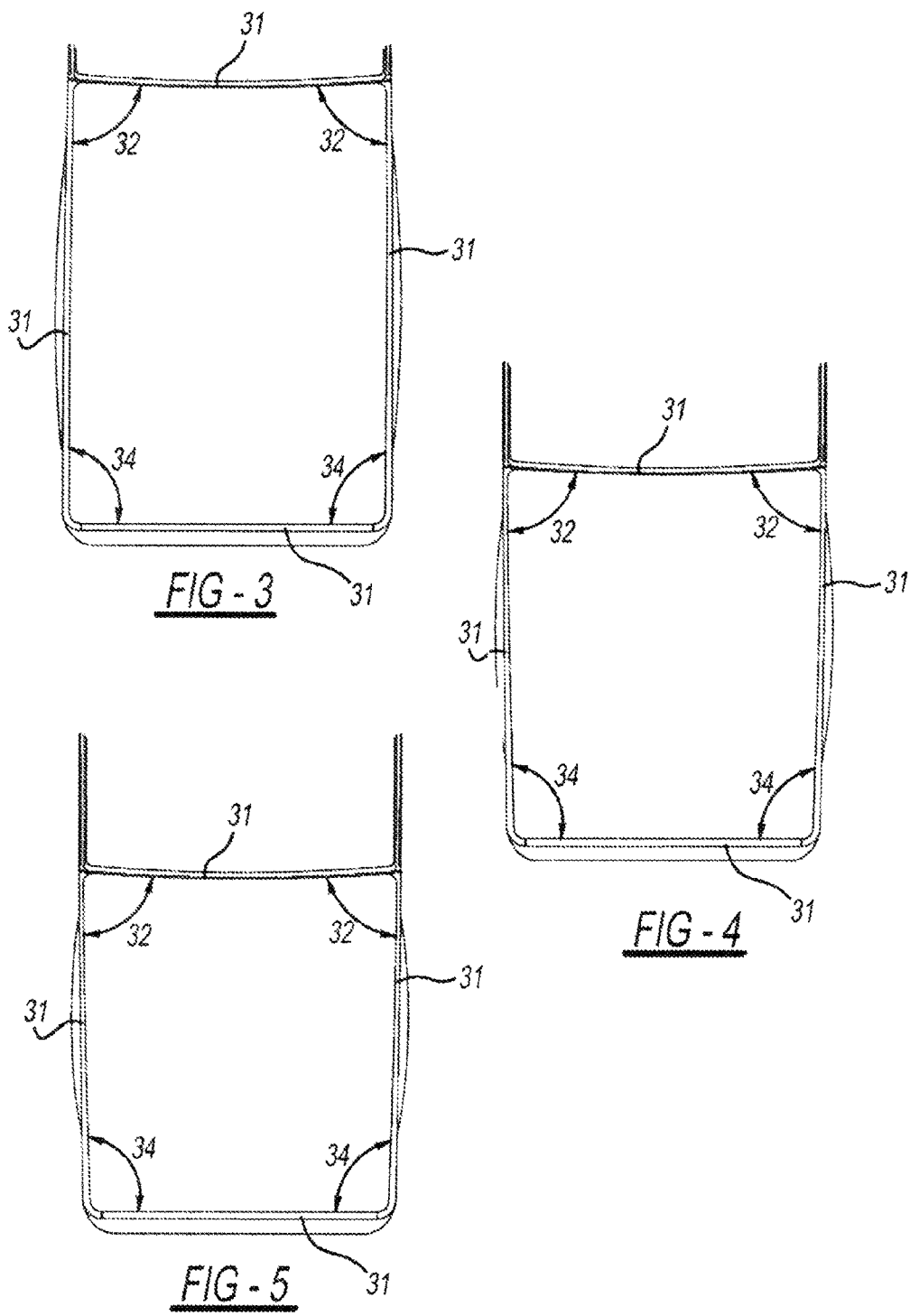

PICKUP TRUCK BED TONNEAU COVER SUPPORT STRUCTURE AND METHOD

CROSS-REFERENCE TO RELATED APPLICATIONS

This application claims the benefit of U.S. Provisional Application No. 61/663,298, filed on Jun. 22, 2012. The entire disclosure of the above application is incorporated herein by reference.

BACKGROUND AND SUMMARY

The present disclosure relates to pickup truck bed tonneau covers, and more particularly to support structures for such tonneau covers with flexible textile coverings.

This section provides background information related to the present disclosure which is not necessarily prior art. This section also provides a general summary of the disclosure, and is not a comprehensive disclosure of its full scope or all of its features, nor are the features summarized herein essential aspects of the disclosure.

Pickup truck tonneau covers can include an outer frame with several intermediate cross-car rails spanning between opposing sides of the outer rail. These intermediate rails span the cross-car width of the pickup truck bed and are unsupported, except at their ends. A flexible fabric cover can be supported by and coupled to this frame and intermediate rail supporting structure.

Pickup truck beds can have perimeters of various configurations. Some pickup truck bed perimeters are rectangular; having 90 degree corners. Other pickup truck bed perimeters are slightly trapezoidal in shape; having front corner angles that are slightly less than 90 degrees and rear corner angles that are slightly greater than 90 degrees. The lengths of the sides can also vary depending upon the size of the pickup truck bed, although the length of the perimeter's front and back typically remains constant. As seen in FIGS. 3-5, the corner angles and side perimeter dimensions can be different, even for the same make and model pickup truck, depending upon whether a particular pickup truck has a standard cab (FIG. 3), an extended cab (FIG. 5) or an intermediate length cab (FIG. 4). Thus, manufacturing specific components for each angular and dimensional option unduly multiplies the need for expensive tooling components and/or machining operations (e.g., associated with creating coupling components at differing locations) in order to meet all the various angular and dimensional configurations.

The need for expensive tooling and/or machining operations can be reduced by using pickup truck bed tonneau cover components that are universally capable of use for a variety of bed perimeter configurations, and for the full variety of positions within the resulting variety of pickup truck bed tonneau covers.

In aspects of the present disclosure methods of manufacturing a pickup truck bed tonneau cover and a variety of pickup bed tonneau covers are provided. For example, universal cross-section outer frame rail stock is cut to appropriate lengths to create all front, rear, and side frame rails of the multiple versions of the tonneau cover. First and second universal corner bracket members are provided that can be coupled together in a plurality of angular corner positions. Pairs of the first and second universal corner bracket members are adjusted relative to each other and each pair of first and second universal corner bracket members is coupled together, fixing the pair into one of the angular corner positions to create all corner brackets of the multiple versions of the tonneau cover. Universal cross-section intermediate rail stock is cut to appropriate lengths to create all intermediate rails of the multiple versions of the tonneau cover. Universal intermediate rail brackets are provided that can be coupled to the intermediate rails at a plurality of angular bracket positions. Universal intermediate rail brackets are coupled to each side rail member to provide opposing pairs of the universal intermediate rail brackets for each intermediate rail of the multiple versions of the tonneau cover. Each end the intermediate rails are adjusted into one of the plurality of angular bracket positions and coupled to a corresponding opposing pair of universal intermediate rail brackets to affix the intermediate rails into one of the angular bracket positions.

In other aspects of the present disclosure a pickup bed tonneau cover and a variety of pickup bed tonneau covers are provided. For example, an outer frame includes a front rail, a rear rail, and a plurality of side rails, and all of the front rail, the rear rail and the side rails of the variety of pickup bed tonneau covers have a same universal frame rail cross-section throughout their length. Each of the variety of tonneau covers has a front pair and a rear pair of corner brackets. Each corner bracket includes first and second universal corner bracket members configured to be coupled together in different fixed positions to form one of a plurality of potential angles. The potential angles include angles that are both greater than and less than 90 degrees. For each of the variety of tonneau covers, each front pair of corner brackets is coupled to the front rail and an adjacent one of the side rails, and each rear pair of corner brackets is coupled to the rear rail and an adjacent one of the side rails. A plurality of intermediate rails span between the side rails of each outer frame, and all intermediate rails of the variety of pickup bed tonneau cover have a uniform intermediate rail cross-section throughout their length. A universal intermediate rail bracket is coupled to each side rail of each outer frame to provide opposing pairs of the universal intermediate rail brackets. The universal intermediate rail brackets are configured to be coupled to opposing ends of each intermediate rail at any of a corresponding plurality of potential angles.

In another aspect of the disclosure a pickup bed tonneau cover includes a plurality of outer rails each have a uniform cross-section throughout its length. The plurality of outer rails are joined together via hinges and corner brackets to form the outer frame of the pickup bed tonneau cover. The uniform cross-section of the outer rails defines, along the entire length of the outer rails, an elongated seal coupling channel and an elongated step adjacent to, and protruding downwardly beyond, the seal coupling channel. A compressible seal member is coupled to the outer rails via the seal member coupling extending throughout the length of the outer rails. The compressible seal member has a non-compressed state in which the distal portion of the compressible seal member extends downwardly past the adjacent elongated step. When the pickup truck bed tonneau cover is mounted over a perimeter of a corresponding pickup truck bed, the downwardly protruding elongated step member acts as a continuous elongated stop by contacting against the perimeter to limit compression of the compressible seal member. This may occur under normal static loads, or may only occur during dynamic or excessive downward loads (e.g., snow loads) on the tonneau cover.

Further areas of applicability will become apparent from the description provided herein. The description and specific examples in this summary and in the following description are intended for purposes of illustration only and are not intended to limit the scope of the present disclosure.

BRIEF DESCRIPTION OF THE DRAWINGS

FIG. 3 is a schematic top plan view representation of a truck bed perimeter when the truck has a standard cab configuration;

FIG. 4 is a schematic top plan view representation of a truck bed perimeter similar to FIG. 3 when the truck has an intermediate cab configuration;

FIG. 5 is a schematic top plan view representation of a truck bed perimeter similar to FIG. 3 when the truck has an extended cab configuration;

DETAILED DESCRIPTION

Figure 1:
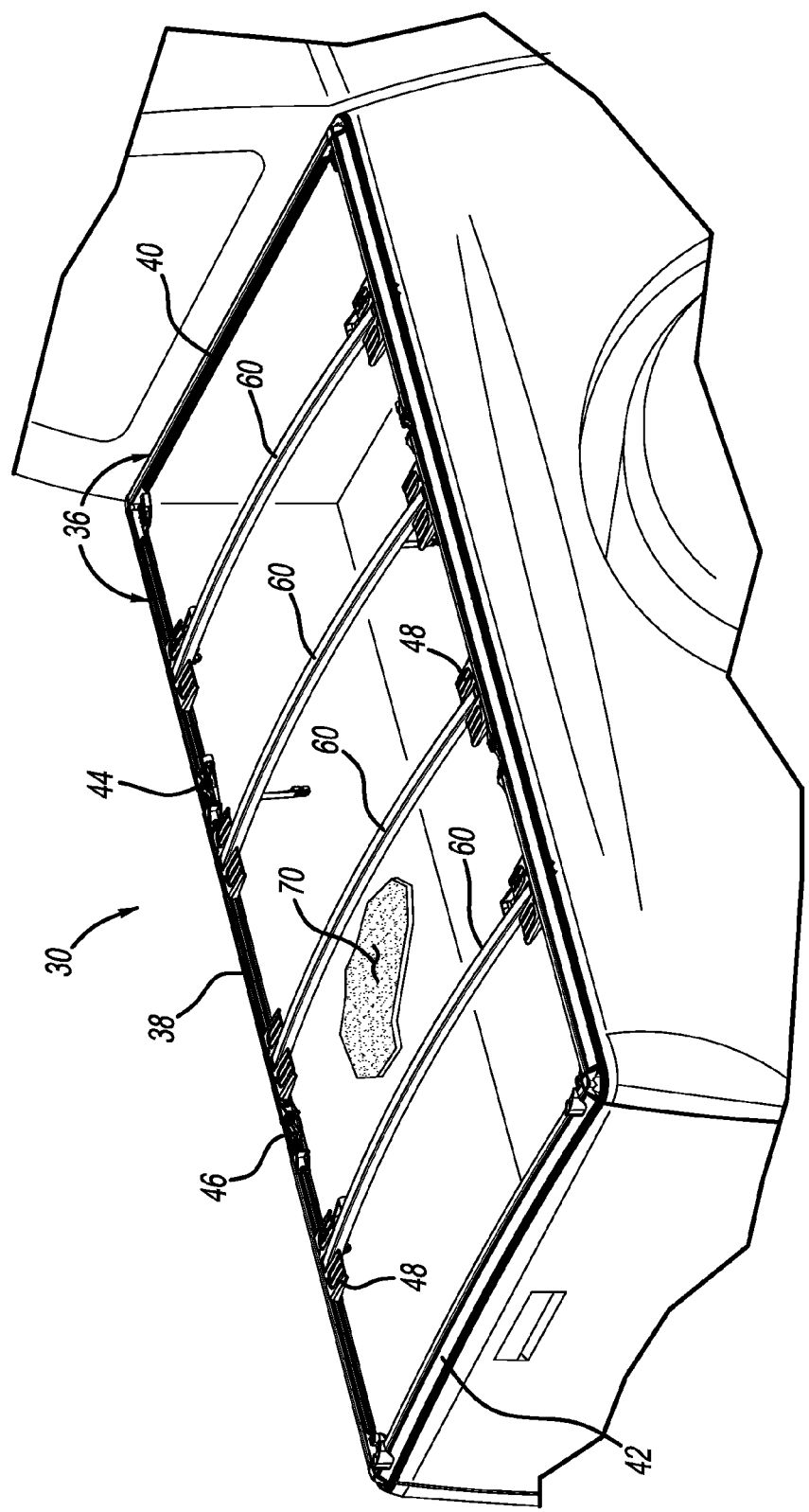
FIG. 1 is a partial perspective view of a pickup truck and a pickup bed tonneau cover showing only a cut-away portion of the flexible textile covering.
Figure 2:
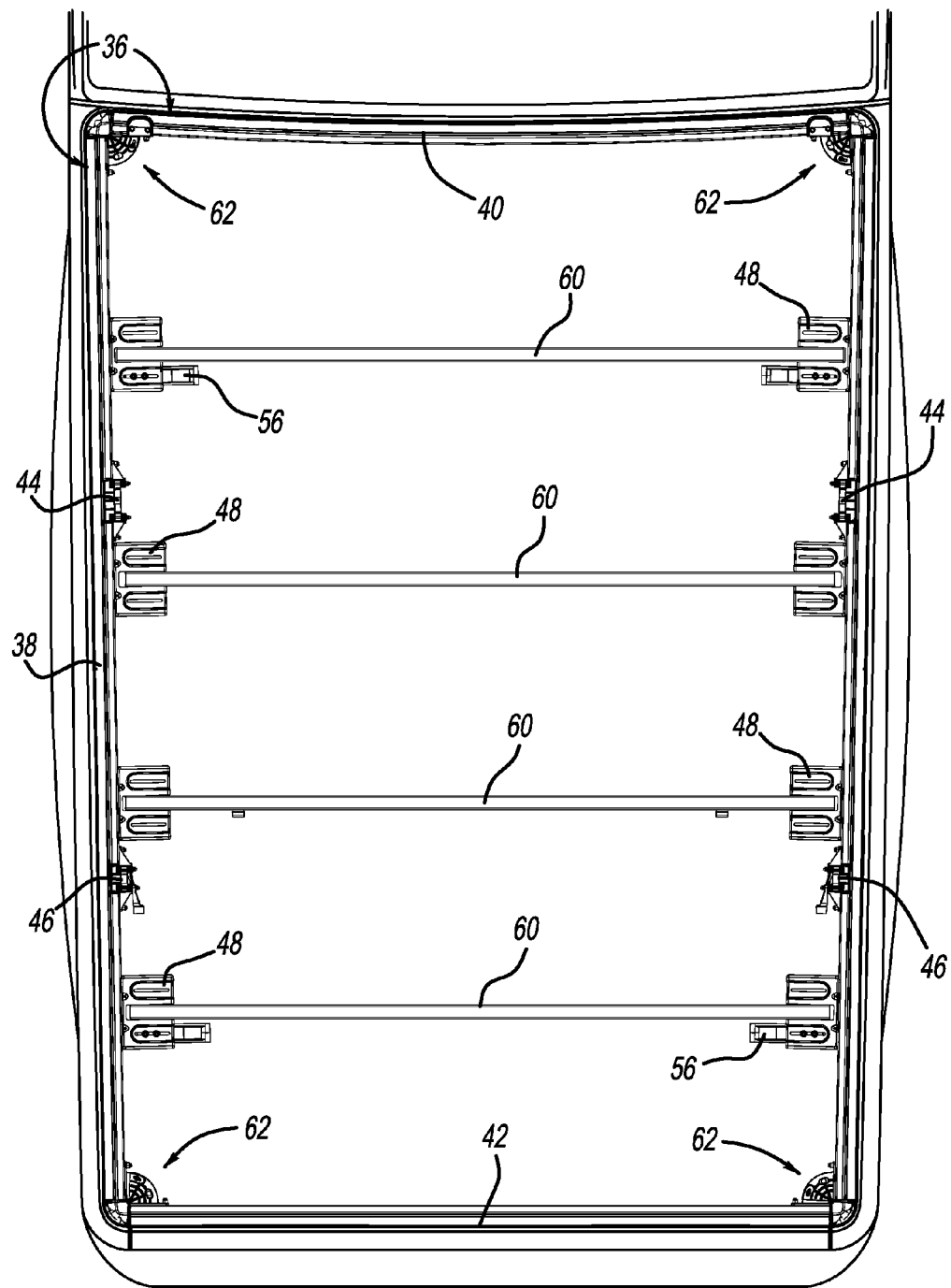
FIG. 2 is a top plan view of FIG. 1 with the flexible textile covering removed to expose the outer frame and cross bar elements.
Figure 6:
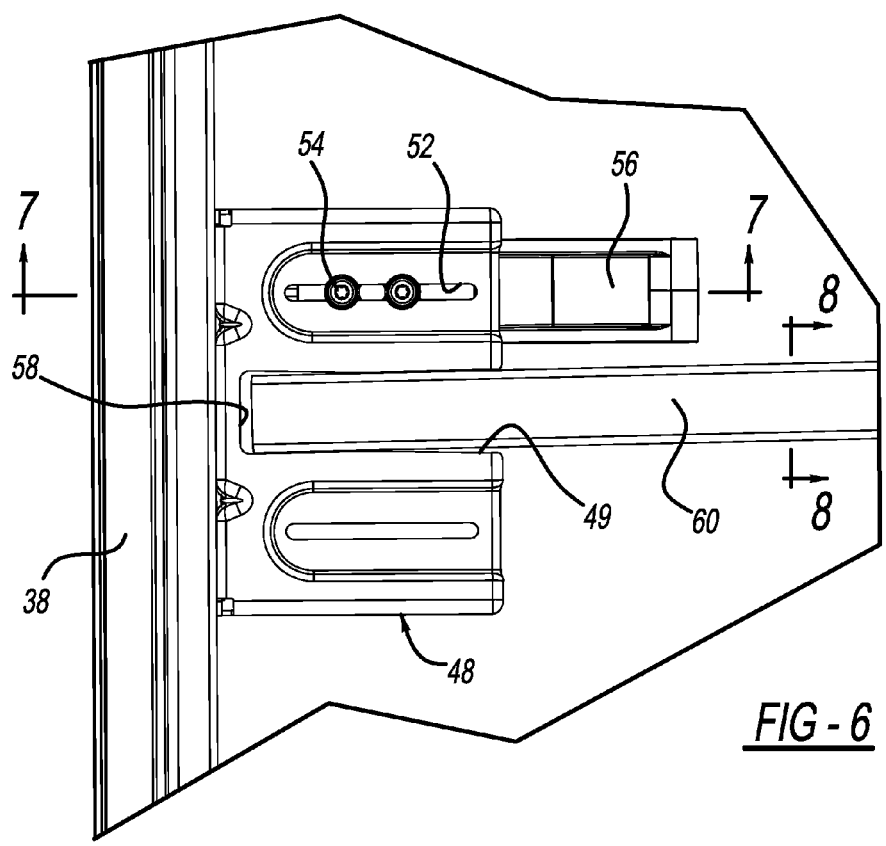
FIG. 6 is an enlarged top plan view of the cross bar bracket and side rail member of the embodiment of FIG. 1.
Figure 7:
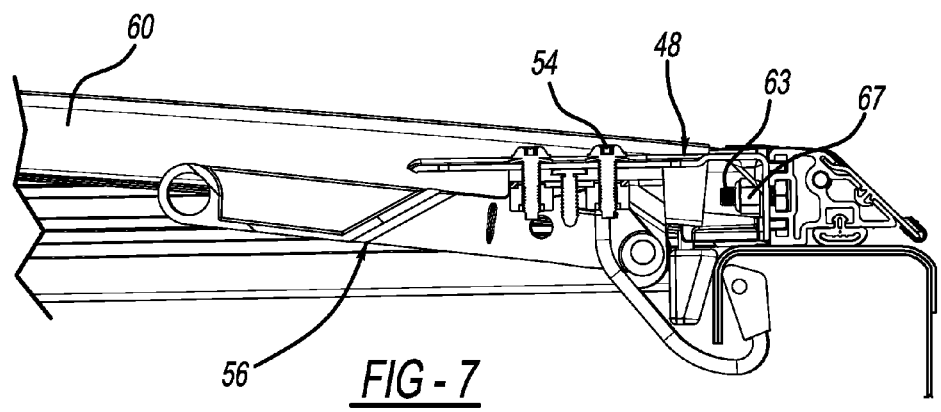
FIG. 7 is a cross-sectional view taken along line 7-7 of FIG. 6.

One exemplary embodiment of a pickup truck tonneau cover 30 of the present disclosure is illustrated with reference to FIGS. 1-19. Pickup truck beds have a generally rectangular perimeter 31 (FIGS. 3-5). In some cases the perimeter has four 90 degree corners and is rectangular. In other cases, the generally rectangular shape is slightly trapezoidal in nature, with the two forward corners having an angle 32 slightly less than 90 degrees and the two rearward corners having an angle 34 that is slightly more than 90 degrees. Examples of this are illustrated in FIGS. 3-5, where FIG. 3 is a standard cab configuration, FIG. 5 is an extended cab configuration, and FIG. 4 is an intermediate cab configuration. The difference in these angles 32, 34 from 90 degrees is typically less than about 2 degrees, thereby maintaining the overall generally rectangular shape of the truck bed perimeter.

An outer frame 36 of tonneau cover 30 generally corresponds to the outer perimeter 31 of the pickup truck bed. Side rails 38 extend along the lateral sides of the truck bed. A front rail 40 and a rear rail 42 extend in the cross-car direction. Side rails 38 are coupled to and span between front rail 40 and rear rail 42. Each of front rail 40, rear rail 42, and side rails 38 are made from the same universal frame rail stock. As such, all frame rails 38, 40, 42 of the outer frame 36 have a uniform cross-section throughout their length. One exemplary way to manufacture such uniform cross-section outer frame rails is via a metal extrusion process. The uniform frame rail cross section in this embodiment can be seen in FIGS. 7, 10, 16, 18 and 19.

Front rail 40 is coupled to adjacent side rails 38 via a front pair of universal corner brackets 62. Universal corner brackets 62 include two universal corner bracket members 64, 66 (seen best in FIG. 14) that are configured to be pivotably coupled together and moved into different fixed positions to form one of a plurality of potential angles. For example, when the tonneau cover 30 is intended for a pickup truck bed perimeter 31 having one of the potential slightly trapezoidal shapes (e.g., as seen in FIGS. 3-5), then the first universal corner bracket member 64 and second universal corner bracket member 66 can be coupled together to form a corresponding angle between the front rail 40 and adjacent side rails 38 that is slightly less than 90 degrees. The front corner angles 32 of FIG. 3 is slightly larger than the front corner angle 32 of FIG. 4, which is slightly larger than the front corner angle 32 of FIG. 5, and the universal bracket members 64, 66 can be coupled together in any of the fixed positions relative to each other as necessary to produce any of these alternative acute angles as well as to match a 90 degree cornered perimeter.

Rear rail 42 is similarly coupled to adjacent side rails 38 via a rear pair of universal corner brackets 62 comprising the identical universal bracket members 64, 66. In the example where tonneau cover 30 is intended for a pickup truck bed perimeter 31 having one of the potential slightly trapezoidal shapes (e.g., as seen in FIGS. 3-5), then the first universal corner bracket member 64 and second universal corner bracket member 66 can be coupled together to form a corresponding angle between the rear rail 42 and adjacent side rails 38 that is slightly greater than 90 degrees. The rear corner angles 34 of FIG. 3 is slightly smaller than the rear corner angle 34 of FIG. 4, which is slightly smaller than the rear corner angle 34 of FIG. 5, and the universal bracket members 64, 66 can be coupled together in any fixed position relative to each other as necessary to produce any of these alternative obtuse angles as well as to match a 90 degree cornered perimeter.

First universal corner bracket member 64 is pivotably coupled to second universal corner bracket member 66 via fastener 90. Corner bracket members 64, 66 can be pivoted into a desired angular position relative to each other. Then universal bracket members 64, 66 can be fixed in the desired position using threaded fastener 91 extending through slotted aperture 92. Alternatively or additionally, after pivoting corner bracket members 64, 66 into the desired angular position, aperture 93 can be used as a guide for drilling a hole through thickened portion 94 of first universal corner bracket member 64 and a rivet 95 inserted to fix the desired angular position.

Figure 15:
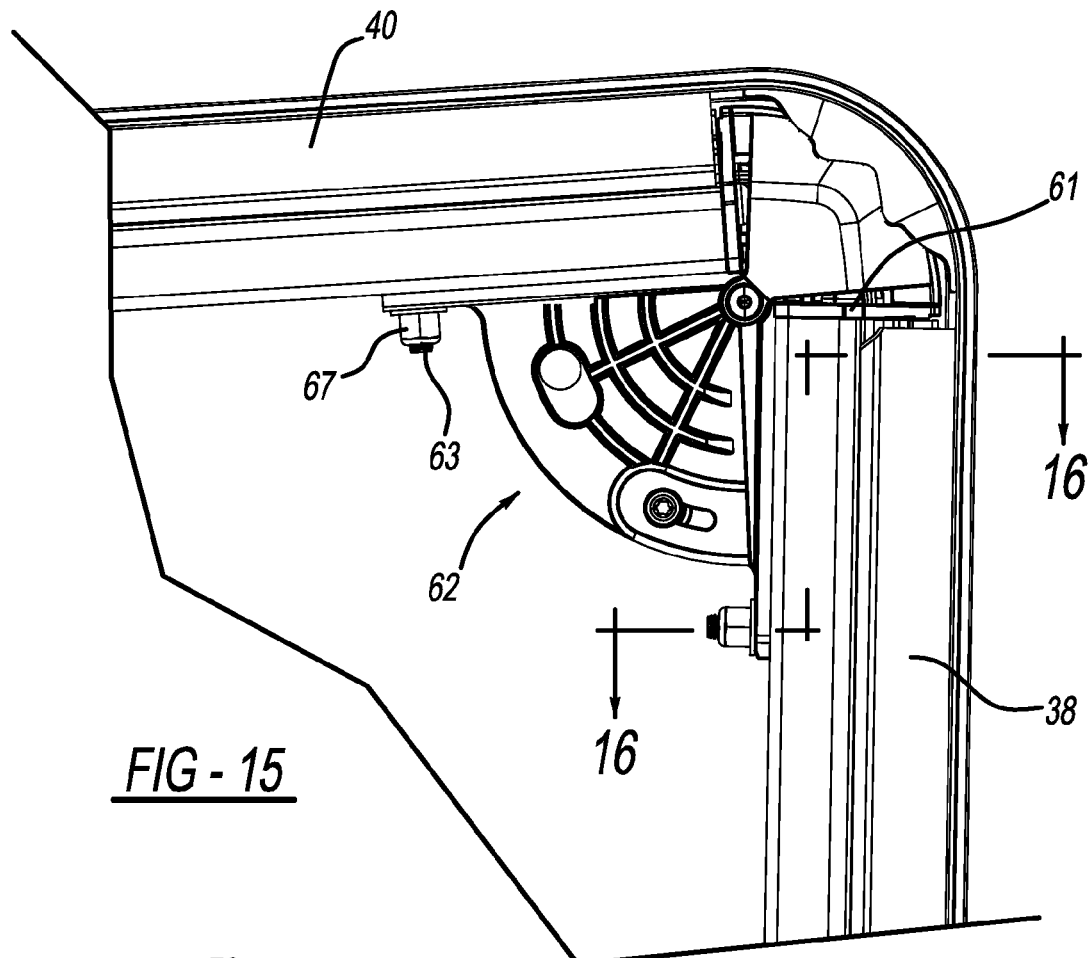
FIG. 15 is a top plan view of the corner bracket assembly and adjacent components.
Figure 16:
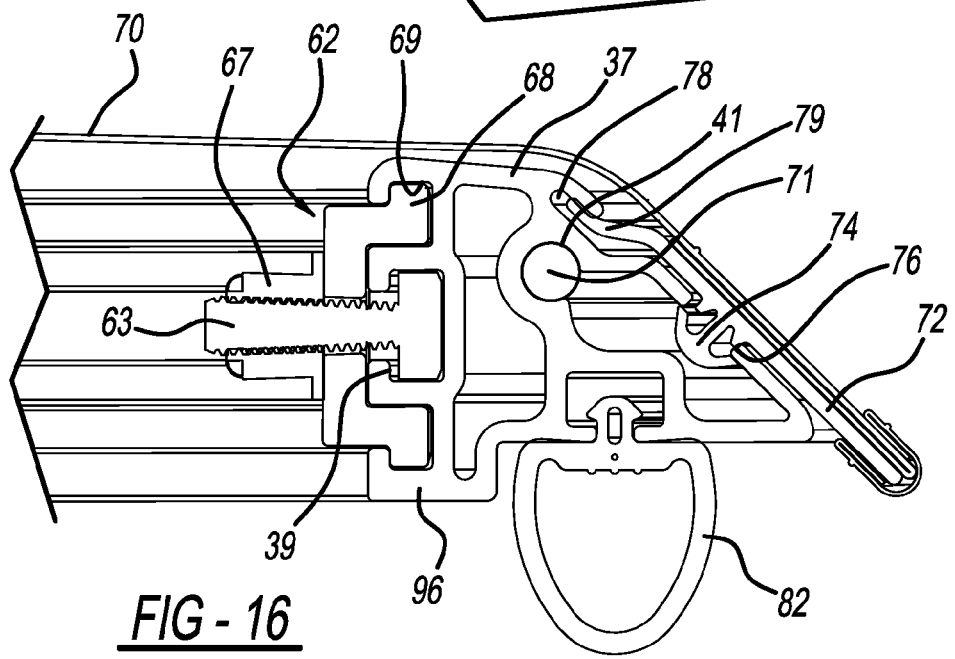
FIG. 16 is a cross sectional view taken along line 16-16 of FIG. 15.
Figure 17:
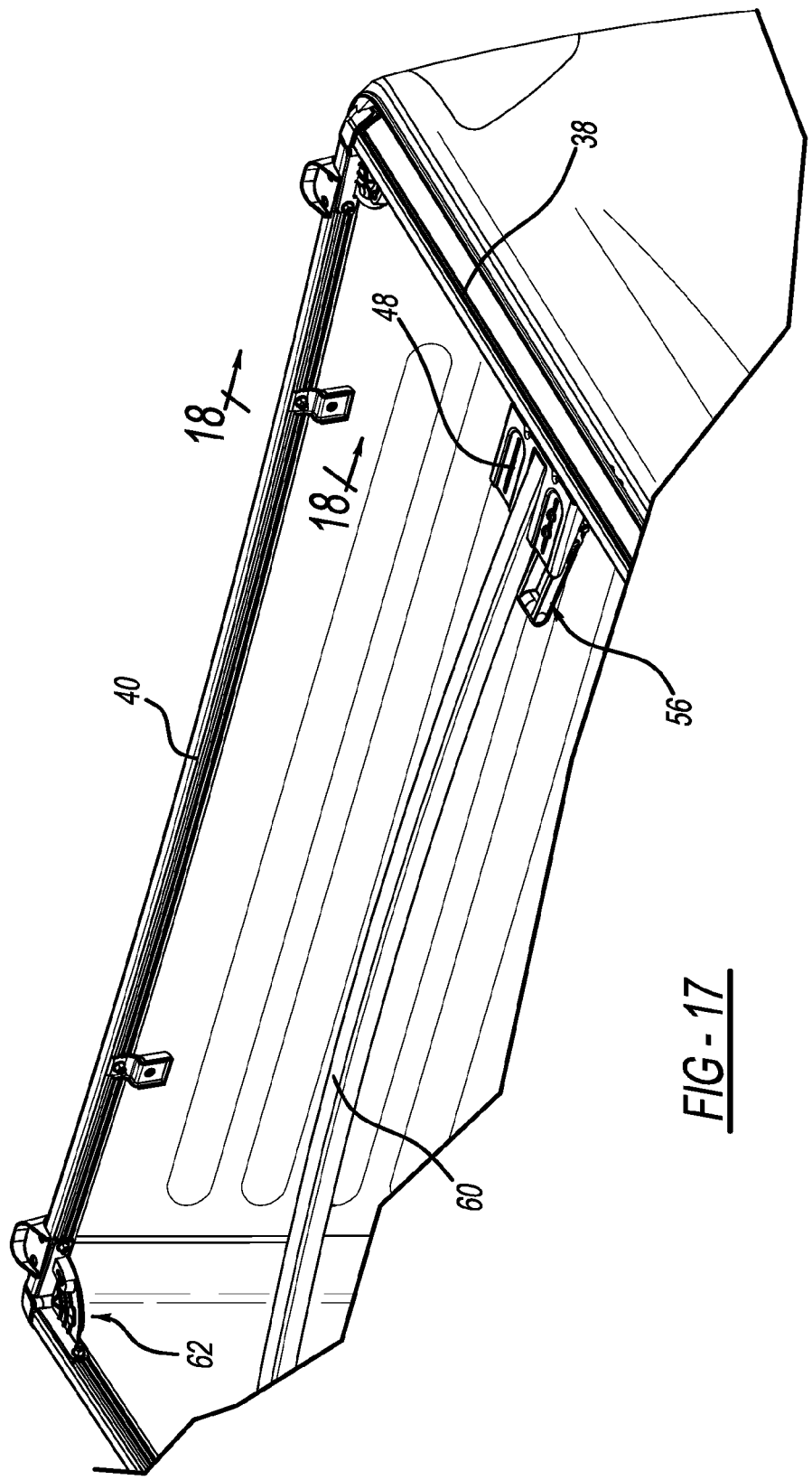
FIG. 17 is an enlarged partial perspective view of the embodiment of FIG. 1, focusing on the front rail and related features.

Referring to FIGS. 15 and 16, the universal corner bracket 62 coupling arrangement of this embodiment is exemplified with respect to front rail 40 and a side rail 38. Universal cross section 37 of rails 38, 40, 42 forming the outer frame 36 includes a fastener retention channel 39 that therefore extends along the entire length of an inner side of rails 38, 40, 42. A head of a threaded fastener 63 is inserted into fastener retention channel 39. Threaded fastener 63 is retained from rotating by sides of fastener retention channel 39. The threaded shaft of fastener 63 extends through a corresponding aperture 65 in universal corner bracket 62, which is retained by threaded nut 67.

The corner bracket 62 also includes flanges 68 that are retained in cooperating flange retention channels 69 that are provided along the entire length of the inner side of outer frame rails 38, 40, 42 resulting from their universal cross section 37. Thus, uniform corner brackets 62 are coupled to the inner side of any outer frame rail 38, 40, 42 without the need for any machining.

This uniform cross-section 37 also includes an unthreaded end fastener retention channel 41 along the entire length of outer frame rails 38, 40, 42. Each of the universal corner bracket members 64, 66 has flange 61 that fit against the end of adjacent rails 38, 40, which includes an aperture 59. A threaded fastener 71 extends through the aperture and threads of a threaded fastener 71 bite into the sides of unthreaded end fastener retention channel 41, thereby coupling the universal corner bracket members 64, 66 to the end of each adjacent rail 38, 40 as well. Thus, universal corner brackets 62 are additionally coupled to ends of adjacent side rails 38, 40, 42 without the need for machining.

Universal intermediate cross-bar rail brackets 48 are arranged in pairs that are coupled to opposing side rails 38 of outer frame 36. A first of each pair of intermediate rail brackets 48 is coupled to one side rail or side frame member 38, and the second of each pair of intermediate rail brackets 48 is coupled to opposing side rail or side frame member 38.

The universal intermediate rail brackets 48 are coupled to side rails 38 using one or more of the same fastener retention channel 39, bolt 63 and nut 67 arrangements discussed previously in reference to the corner brackets 62 and FIG. 16. Because the intermediate rail bracket members are not positioned adjacent an end of the rail members, the unthreaded fastener retention channel 41 and threaded fastener 71 arrangement is not used with the intermediate rail brackets 48. Thus, universal intermediate rail brackets 48 can be coupled to side rails 38 at any desired location without the need for machining.

Intermediate cross bar rail brackets 48 include slotted apertures 52 through which screws or bolts 54 can adjustably mount a latching mechanism 56. As such the positioning of the latching mechanism 56 can be adjusted to accommodate for various pickup truck bed perimeter configurations to which the latch releasably and selectively couples. Each Intermediate cross bar rail bracket 48 is symmetrical and includes a set of slotted apertures 52 on each side to accommodate for using oppositely facing brackets 48 to mount latches 56 on both sides of the outer frame 36.

Figure 8:
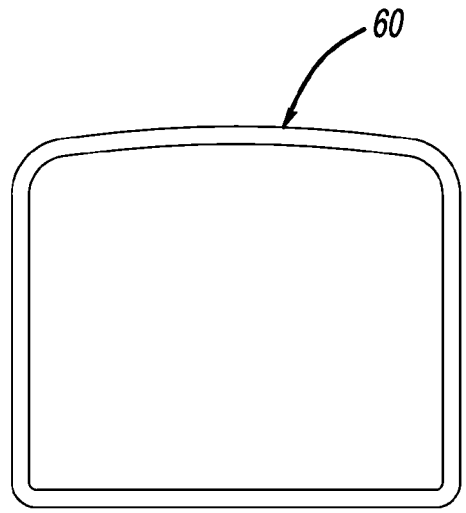
FIG. 8 is a cross-sectional view taken along line 8-8 of FIG. 6.
Figure 9:
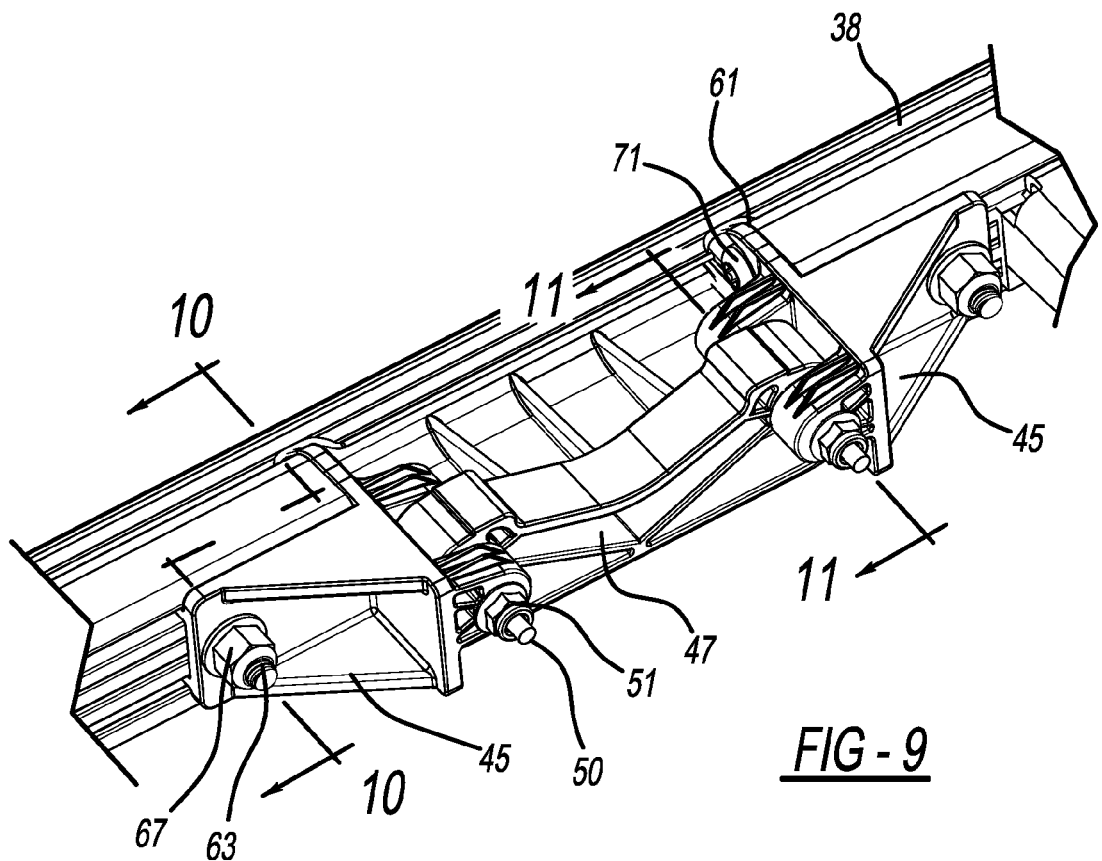
FIG. 9 is an enlarged perspective view of a hinge coupled to the outer frame of the embodiment of FIG. 1.
Figure 10:
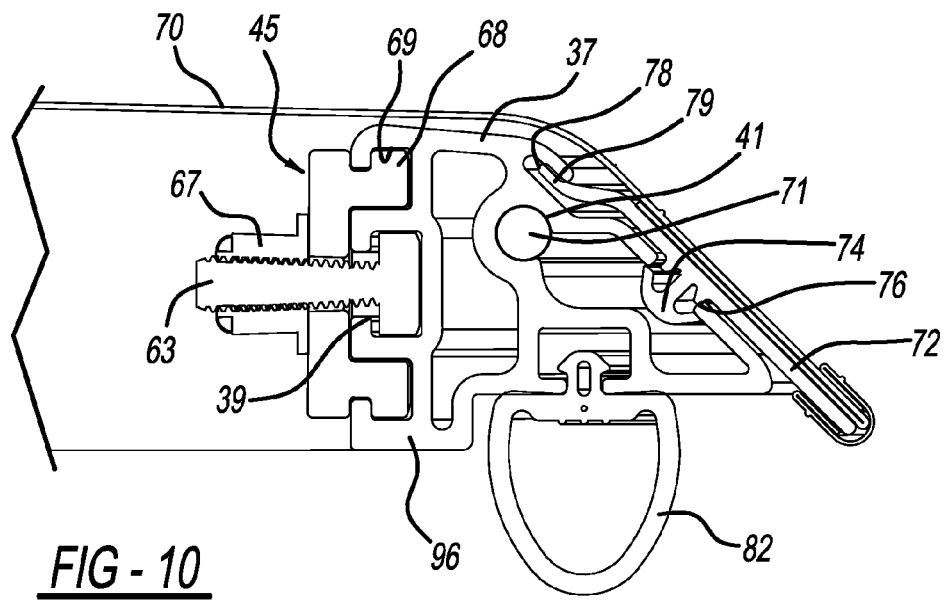
FIG. 10 is cross-sectional view taken along line 10-10 of FIG. 9.
Figure 11:
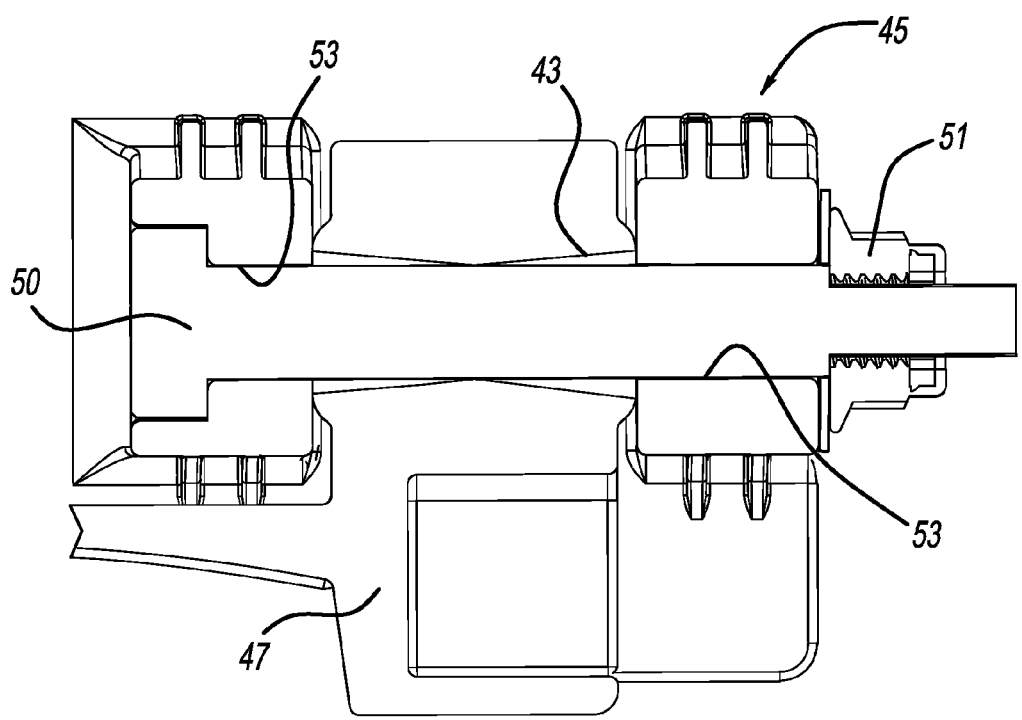
FIG. 11 is cross-sectional view taken along line 11-11 of FIG. 9, including an internal bore having an hourglass shape that has been exaggerated for illustrational purposes.
Figure 12:
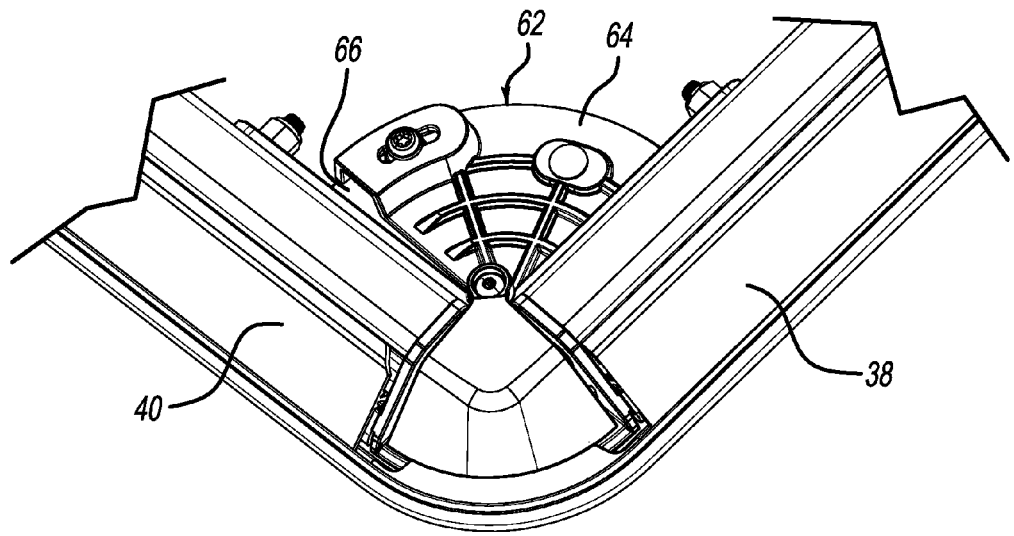
FIG. 12 is a perspective view of a corner bracket assembly of the embodiment of FIG. 1 viewed from outside the outer frame.
Figure 13:
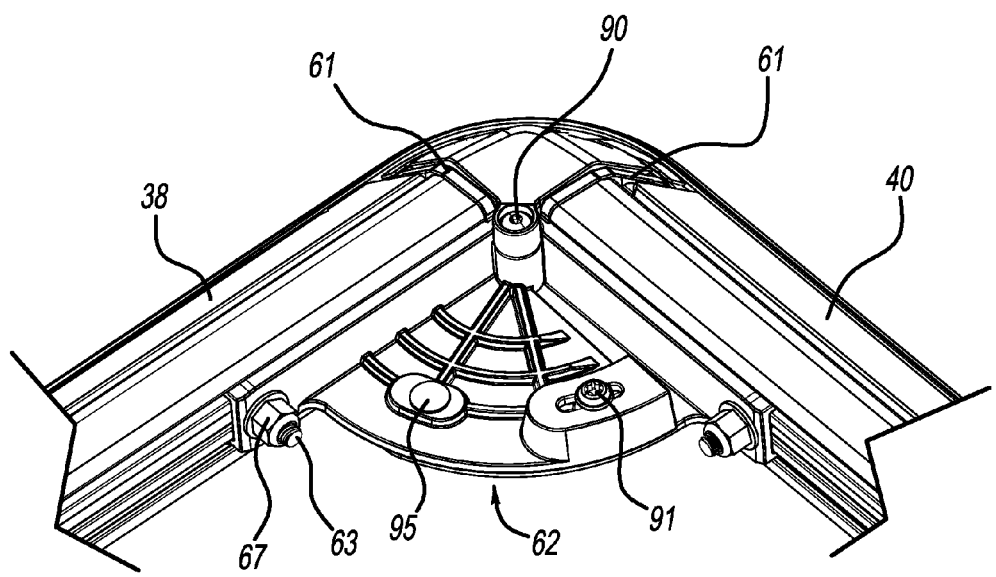
FIG. 13 is a perspective view of the corner bracket assembly of the embodiment of FIG. 1, viewed from inside the outer frame.
Figure 14:
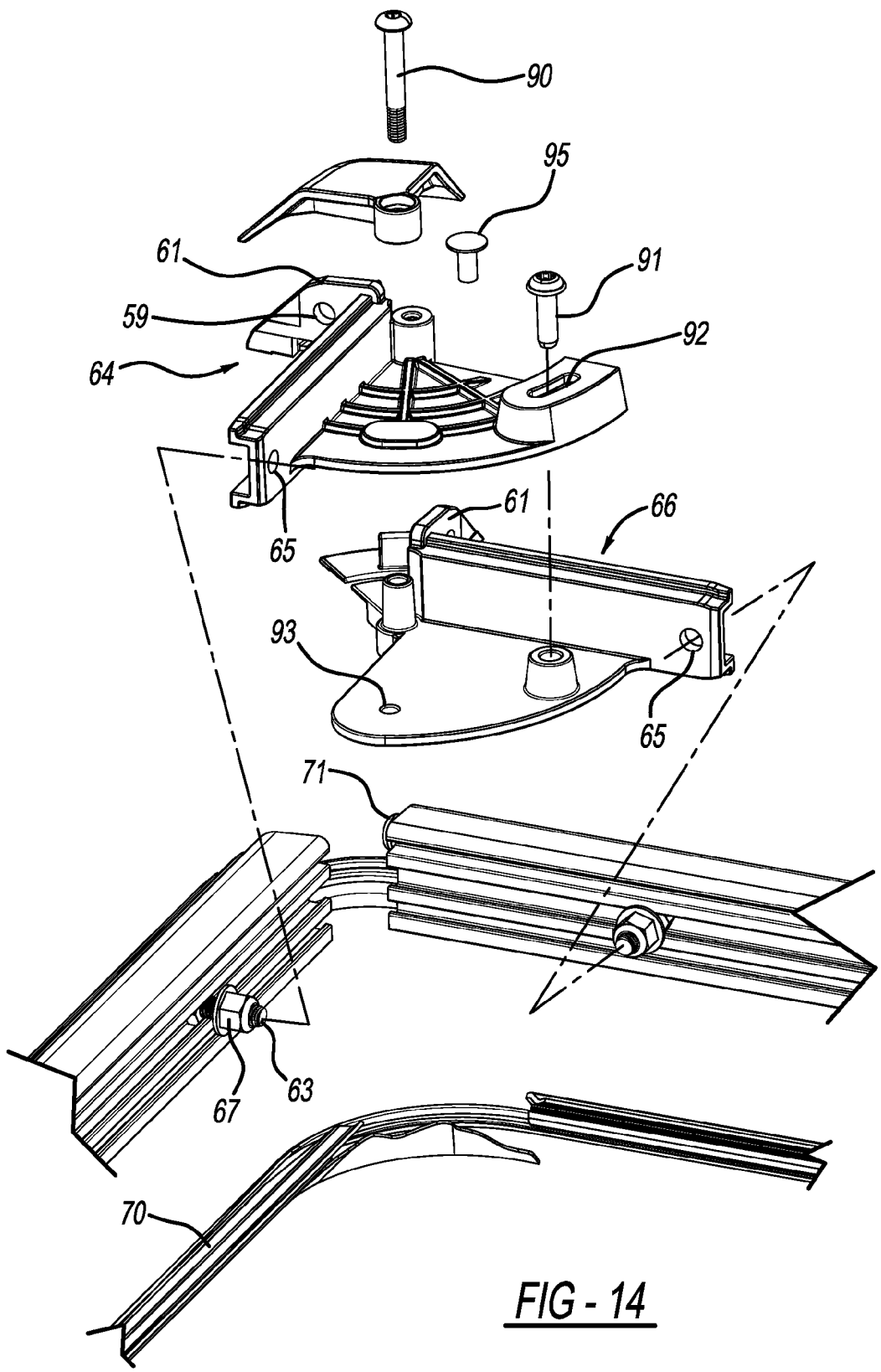
FIG. 14 is an exploded view of a corner bracket assembly and adjacent components.

Bowed Intermediate rails 60 all have a uniform cross-section throughout their length. For example, all intermediate rails 60 of tonneau cover 30 can be made from universal cross-section intermediate rail stock, which may be formed by a metal extrusion process. Universal cross-section intermediate rail stock is cut into desired lengths. The universal cross-section of the bowed intermediate rail 60 can have a curved upper surface and a flat bottom surface as illustrated in FIG. 8. In addition, each intermediate rail 60 has an upwardly bowed configuration along its length.

Intermediate rails 60 span between and are coupled to the side rails 38 via pairs of universal intermediate rail brackets 48. One end of each intermediate rail 60 is coupled to the one of a pair of universal brackets 48. The opposing end of the intermediate rail 60 is coupled to the other of the pair of brackets 48. A universal intermediate rail bracket coupled to a left side rail 38 is turned 180 degrees relative to a universal intermediate rail bracket 48 that is coupled to a right side rail 38. Thus, intermediate rail bracket 48 is configured to receive the end of an intermediate rail 60 and be coupled to the intermediate rail 60 at angles from slightly less than 90 degrees to slightly more than 90 degrees to permit use of the same universal intermediate rail brackets 48 on both of sides of the outer frame 36. In this embodiment, this angular accommodating configuration is provided by the hourglass-shaped opening 49 at the center of the universal intermediate rail bracket 48.

An end of intermediate rail 60 is positioned in opening 49 at the appropriate angle, which leaves some small side gaps between bracket 48 and bowed intermediate rail 60. Intermediate rail 60 and bracket 48 are then welded together allowing the weld material to fill the side gaps resulting from the hourglass-shaped opening 49. Even with the trapezoidal perimeters of FIGS. 3-5, it is not necessary that each intermediate rail 60 be cut from universal rail stock to an individual length. For example several of intermediate rails 60 can be cut to the same length while others are cut to different lengths. Uniform intermediate rail bracket 48 accommodates the use of some same length intermediate rails 60 with trapezoidal outer frames 36 because it allows an end gap 50 that need not be of any specific dimension, thereby accommodating a certain acceptable range of intermediate rail 60 lengths for any specific intermediate rail bracket 48 pair.

Each side rail 38 includes three sub-rails coupled together via two pairs of hinges 44, 46 that permit tonneau cover 30 to be manually folded in a tri-fold configuration. As exemplified in FIG. 9, each hinge 44, 46 comprises a pair of universal hinge brackets 45 coupled to ends of adjacent side rails 38 to create an opposing pair of universal hinge brackets 45. The coupling arrangement of the hinge brackets 45 to side rails 38 is the same as that already described herein for the corner bracket in reference to FIG. 16, including the threaded fastener 63 and fastener retention channel 39 combination, and the flange 68 and flange retention channel 69 combination provided coupling along inner sides of side rails 38. In addition the coupling arrangement of the hinge brackets 45 to side rails 38 includes the threaded fastener 71 and unthreaded retention channel 41 combination providing coupling at distal end of side rails 38.

Coupling opposing hinge brackets 45 together are pairs of universal hinge pivots 47. Universal hinge pivots 47 for the rear pair of hinges 46 are shorter than those for the front pair of hinges 44. Each universal hinge pivot 47 can be used to create a hinge pair aligned on both sides of outer frame 36 by rotating hinge pivots 47 180 degrees in order to complete the opposite hinge of the hinge pivot pair. To accommodate the various angles involved in using the identical hinge pivot 47 on both sides of a trapezoidal outer frame 36, each of the hinge pivots 47 of tonneau cover 30 has an hourglass or bow tie shaped bore 43 as seen (greatly exaggerated) in FIG. 11. Bolts 50 extend through bores 53 of each universal hinge bracket 45 and through hourglass-shaped bore 43 of hinge pivot 47. Nut 51 is threaded onto each bolt 50 and tightened against a shoulder Referring to FIGS. 18 and 19, universal cross-section 37 of outer frame rails 38, 40, 42 includes a seal retention channel 80 that extends throughout their length. Pickup truck bed tonneau cover 30 includes universal large seal member 82, universal small seal member 84, and transition seal member 86. Each seal member 82, 84, 86, includes a universal cooperating retention member 85 having shoulders or barbs that is retained in seal retention chamber 80 to couple seal members 82, 84, 86 to the outer frame 36.

Figure 18:
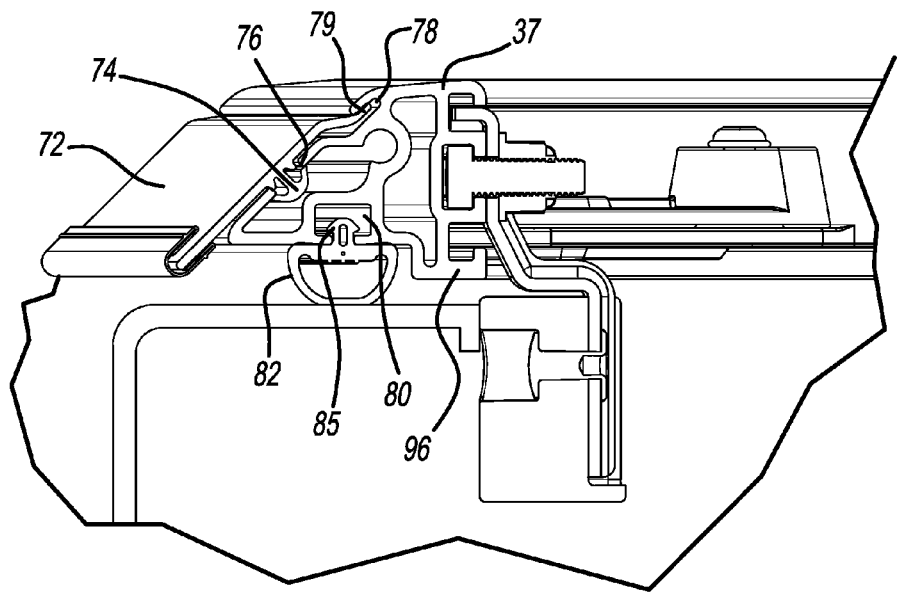
FIG. 18 is a cross sectional view taken along line 18-18 of FIG. 17.
Figure 19:
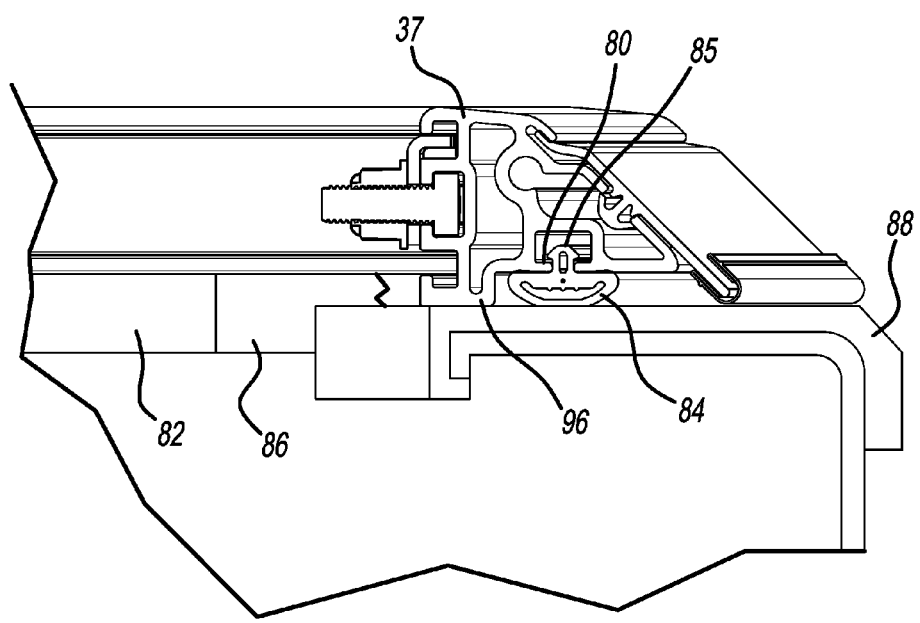
FIG. 19 is a partial cross-sectional and fragmented view taken along line 19-19 of FIG. 17, which has been simplified to better illustrate various seal features Example embodiments will now be described more fully with reference to the accompanying drawings. Corresponding reference numerals indicate corresponding parts throughout the several views of the drawings.

Universal large transition seal member is provided along lengths of the outer frame 36 where necessary to accommodate large gaps adjacent the perimeter of tonneau cover 30, and between tonneau cover 30 and the adjacent pickup truck bed perimeter 31. For example, as seen in FIG. 19, the adjacent pickup truck perimeter 31 includes a protective plastic covering 88 adjacent side rails 38. As such, the gap at this location is relatively small requiring the use of small seal member 84. As seen in FIG. 18, the adjacent pickup truck perimeter 31 does not include protective plastic covering 88 adjacent side rails 38. As such, the gap at this location is relatively large requiring the use of large seal member 82. Transition seal member 86 has a similar hollow cross-sectional structure, but has a sloped bottom transition along its length between large seal member 82 and small seal member 84. For example, transition seal member 86 is provided at the location at any points at which plastic covering 88 terminates, whether along front rail 40, rear rail 42, and side rails 38.

A flexible textile member 70 covers the intermediate cross-car rails 60 and outer frame 36 and is coupled thereto. Flexible textile 70 includes any materials having a desired resistance to abrasion, tearing, and external elements, such as a leather, a vinyl, or a polyvinyl chloride-coated (PVC) material.

Flexible textile member 70 can be joined to a plastic coupling member 72 including a barb 74 that that couples with a cooperating retention slot 76 provided in uniform cross-section 37 along the outside of rails 38, 40, 42. Uniform cross-section 37 also includes an edge receiving slot 78 to receive bent extension 79 along upper edge of plastic coupling member 72. Thus, bent extension 79 is first fit into edge receiving slot 78. This locates barb 74 in proper position adjacent cooperating slot 76 facilitating easy coupling between barb 74 and slot 76 along the length of rails 38, 40, 42.

Uniform cross section 37 of the outer rails includes an elongated step 96 adjacent to, and protruding downwardly beyond, the seal coupling channel. Elongated step 96 extends continuously throughout the length of the outer rails 38, 40, 42. Adjacent compressible seal member 82, 84, 86 has a non-compressed state in which the distal portion of compressible seal member 82, 84, 86 extends downwardly past adjacent continuous elongated step 96. Continuous elongated step 96 acts as a stop when it contacts against the perimeter to limit compression of adjacent compressible seal member 82, 84, 86.

Also included in this disclosure are methods for manufacturing one and a variety of pickup truck tonneau covers. These methods should be apparent from the disclosure above. Such methods include providing a generally rectangular outer frame 36 with a configuration that substantially corresponds to a pickup truck bed perimeter 31. Providing outer frame 36 can include providing an outer frame 36 having any of the features disclosed herein, including those of front rails 40, rear rails 42, side rails 38, hinges 44, 46, corner brackets 62, seal members 82, 84, 86, etc.

Universal cross-section outer frame rail stock can be formed by a metal extrusion molding process. The universal cross-section outer frame rail stock is cut to appropriate lengths to create all front 40, rear 42, and side 38 frame rails of tonneau cover 30. Thus, only one tool set is needed to make all front 40, rear 42, and side 38 frame rails of multiple versions of the tonneau cover.

A plurality of first and second universal corner bracket members 64, 66 are formed by a plastic injection molding process that can be coupled together in a plurality of angular corner positions. Pairs of first and second universal corner bracket members 64, 66 are pivotably adjusted relative to each other and each pair is coupled together to fix the pair into one of the angular corner positions to create all corner brackets 62 of the tonneau cover. Thus, only one tool set for each of the first and second universal corner brackets 64, 66 is needed to make all corner brackets for multiple versions of the tonneau cover.

Universal cross-section intermediate rail stock can be formed by a metal extrusion molding process. The universal cross-section intermediate rail stock is cut to appropriate lengths to create all intermediate rails 60 of the tonneau cover. Intermediate cross bar rails 60 can additionally be formed into a bowed shape. Thus, only one tool set is needed to make all intermediate rails 60 of multiple versions of the tonneau cover.

Universal intermediate rail brackets 48 can be formed by a metal stamping process. The intermediate rail brackets are provided with an intermediate rail coupling configuration 49 that can accommodate coupling to intermediate rails 60 thereto in a variety of angular positions. The intermediate rail brackets 48 are also symmetrical so that they can be coupled to both side rails 38.

Each intermediate rail 60 is adjusted into the desired angular bracket position and coupled at each end of each intermediate rail 60 to a corresponding opposing pair of universal intermediate rail brackets 48 to affix the intermediate rails 60 into one of the angular bracket positions. Thus, only one tool set is needed to make all intermediate rails of multiple versions of the tonneau cover.

Universal hinge bracket member 45 is coupled to ends of the side rails 38 to create an opposing pair of universal hinge brackets 45 for each hinge of the multiple versions of the tonneau cover. Each opposing pair of universal hinge brackets 45 is coupled together with a hinge member 47 configured to allow rotation of the tonneau cover 30 along a hinge line extending at any of the plurality of potential angular positions relative to side rails sufficient 38 to accommodate the multiple versions of the tonneau cover. Each hinge member 47 can be one of two universal hinge members to create all hinges 44, 46 of the multiple versions of the tonneau cover.

Additional applications filed on this same date contain information related to the above disclosure. These are U.S. patent application Ser. No. 13/538,049, entitled "Tonneau Cover Apparatus for a Pickup Truck Bed"; U.S. patent application Ser. No. 13/537,897, entitled "Tonneau Cover System for a Pickup Truck Bed"; U.S. patent application Ser. No. 13/538,005, entitled "Tonneau Cover Frame for a Pickup Truck Bed"; and U.S. patent application Ser. No. 13/538,149, entitled "Tonneau Cover Assembly for a Pickup Truck Bed"; each of which has a filing date of Jun. 29, 2012. The entire disclosures of each of the above applications are incorporated herein by reference.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in alternative embodiments, even if not specifically shown or described. The same may also be varied in many ways. Such variations are not to be regarded as a departure from the disclosure, and all such modifications are intended to be included within the scope of the disclosure.

The invention claimed is:

1. A method of manufacturing a pickup truck bed tonneau cover from universal components comprising:
cutting universal cross-section outer frame rail stock to appropriate lengths to create all front, rear, and side frame rail members of the tonneau cover;
providing first and second universal corner bracket members that can be coupled together in a plurality of angular corner positions;
adjusting pairs of the first and second universal corner bracket members relative to each other and coupling each pair of first and second universal corner bracket members together fixing the pair into one of the angular corner positions to create all corner brackets of the tonneau cover;
cutting universal cross-section intermediate rail stock to appropriate lengths to create all intermediate rails of the tonneau cover;
providing universal intermediate rail brackets that can be coupled to the intermediate rails at a plurality of angular bracket positions;
coupling universal intermediate rail bracket to each side rail member to provide opposing pairs of the universal intermediate rail brackets;
adjusting each end of each intermediate rail into one of the plurality of angular bracket positions and coupling each end of each intermediate rail to a corresponding opposing pair of universal intermediate rail brackets to affix the intermediate rails into one of the angular bracket positions;
providing the universal cross-section outer frame rail stock with a side fastener retention channel;
inserting a head of a plurality of fasteners into the side fastener retention chamber of the front, rear, and side frame rail members where the head is retained by the side fastener retention channel;
providing each of the first and second corner bracket members and each of the intermediate rail brackets with an aperture receiving one of the fasteners; and
securing each of the fasteners.

2. The method of manufacturing a pickup truck bed tonneau cover according to claim 1, further comprising:
coupling a universal hinge bracket member to ends of the side frame rail members to create an opposing pair of universal hinge brackets for each hinge of the tonneau cover;
coupling each opposing pair of universal hinge brackets together with a hinge member configured to allow rotation of the tonneau cover along a hinge line extending at any of the plurality of potential angular positions relative to the side rails.

3. The method of manufacturing a pickup truck bed tonneau cover according to claim 2, wherein each hinge member is one of two universal hinge members to create all hinges of the tonneau cover.

4. The method of manufacturing a pickup truck bed tonneau cover according to claim 1 wherein the plurality of fasteners are threaded fasteners, the step of securing each of the fasteners further comprising:
tightening a nut onto each of the threaded fasteners.

5. The method of manufacturing a pickup truck bed tonneau cover according to claim 1, further comprising:
providing the universal cross-section outer frame rail stock with an unthreaded fastener retention channel exposed at cut ends of the front, rear, and side frame rail members;
providing each of the first and second corner bracket members with an end flange having a fastener aperture;
screwing a threaded fastener through each fastener aperture and into an adjacent unthreaded fastener retention channel causing threads of the threaded fastener to bite into the adjacent unthreaded fastener retention chamber.

6. The method of manufacturing a pickup truck bed tonneau cover according to claim 1, further comprising:
coupling a universal latch assembly to each of four universal intermediate rail bracket assemblies to create all latches of the tonneau cover.

7. The method of manufacturing a pickup truck bed tonneau cover according to claim 1, further comprising:
providing the universal cross-section outer frame rail stock with a universal seal coupling channel;
providing each of a large seal member, a small seal member, and a transition seal member with a cooperating universal seal coupling member,
coupling the large seal member to the universal seal coupling channel to accommodate large gaps adjacent the tonneau cover,
coupling the small seal member to the universal seal coupling channel to accommodate small gaps adjacent the tonneau cover, and
coupling the transition seal member to the universal seal coupling channel to transition between the large seal member and the small seal member;
thereby creating a complete perimeter seal for the tonneau cover.

8. The method of manufacturing a pickup truck bed tonneau cover according to claim 1, further comprising:
forming all universal intermediate rail brackets for the tonneau cover by stamping.

9. The method of manufacturing a pickup truck bed tonneau cover according to claim 1, further comprising:
providing the universal cross-section outer frame rail stock with an outer side cover edge receiving channel adjacent an outer side cover retention slot;
inserting an edge of a plastic coupling member of a flexible textile cover into the edge receiving channel and rotating the plastic coupling member to insert a barb-like member of the plastic coupling member into the cover retention slot.

10. A method of manufacturing multiple versions of a pickup truck bed tonneau cover from universal components comprising:
cutting universal cross-section outer frame rail stock to appropriate lengths to create all front, rear, and side frame rail members of the multiple versions of the tonneau cover;
providing first and second universal corner bracket members that can be coupled together in a plurality of angular corner positions;
adjusting pairs of the first and second universal corner bracket members relative to each other and coupling each pair of first and second universal corner bracket members together fixing the pair into one of the angular corner positions to create all corner brackets of the multiple versions of the tonneau cover;
cutting universal cross-section intermediate rail stock to appropriate lengths to create all intermediate rails of the multiple versions of the tonneau cover;

providing universal intermediate rail brackets that can be coupled to the intermediate rails at a plurality of angular bracket positions;

coupling universal intermediate rail bracket to each side frame rail member to provide opposing pairs of the universal intermediate rail brackets for each intermediate rail of the multiple versions of the tonneau cover;

adjusting each end of each intermediate rail into one of the plurality of angular bracket positions and coupling each end of each intermediate rail to a corresponding opposing pair of universal intermediate rail brackets to affix the intermediate rails into one of the angular bracket positions; and forming all universal intermediate rail brackets for the multiple versions of the tonneau cover by stamping.

11. The method of manufacturing multiple versions of a pickup truck bed tonneau cover according to claim 10, further comprising:

coupling a universal hinge bracket member to ends of the side frame rail members to create an opposing pair of universal hinge brackets for each hinge of the multiple versions of the tonneau cover;

coupling each opposing pair of universal hinge brackets together with a hinge member configured to allow rotation of the tonneau cover along a hinge line extending at any of the plurality of potential angular positions relative to the side rails sufficient to accommodate the multiple versions of the tonneau cover.

12. The method of manufacturing multiple versions of a pickup truck bed tonneau cover according to claim 11, wherein each hinge member is one of two universal hinge members to create all hinges of the multiple versions of the tonneau cover.

13. The method of manufacturing multiple versions of a pickup truck bed tonneau cover according to claim 10, further comprising:

providing the universal cross-section outer frame rail stock with a side fastener retention channel;

for each of the multiple versions of the tonneau cover, inserting a head of a plurality of threaded fastener into the side fastener retention chamber of the front, rear, and side frame rail members where the head is retained by the side fastener retention channel;

for each of the multiple versions of the tonneau cover, providing each of the first and second corner bracket members and each of the intermediate rail brackets with an aperture receiving one of the threaded fasteners;

tightening a nut onto each of the threaded fasteners.

14. The method of manufacturing multiple versions of a pickup truck bed tonneau cover according to claim 13, further comprising:

providing the universal cross-section outer frame rail stock with an unthreaded fastener retention channel exposed at cut ends of the front, rear, and side frame rail members;

for each of the multiple versions of the tonneau cover, providing each of the first and second corner bracket members with an end flange having a fastener aperture;

screwing a threaded fastener through each fastener aperture and into an adjacent unthreaded fastener retention channel causing threads of the threaded fastener to bit into the adjacent unthreaded fastener retention chamber.

15. The method of manufacturing multiple versions of a pickup truck bed tonneau cover according to claim 10, further comprising:

providing the universal cross-section outer frame rail stock with an unthreaded fastener retention channel exposed at cut ends of the front, rear, and side frame rail members;

for each of the multiple versions of the tonneau cover, providing each of the first and second corner bracket members with an end flange having a fastener aperture;

screwing a threaded fastener through each fastener aperture and into an adjacent unthreaded fastener retention channel causing threads of the threaded fastener to bite into the adjacent unthreaded fastener retention chamber.

16. The method of manufacturing multiple versions of a pickup truck bed tonneau cover according to claim 10, further comprising:

for each of the multiple versions of the tonneau cover, coupling a universal latch assembly to each of four universal intermediate rail bracket assemblies to create all latches of the tonneau cover.

17. The method of manufacturing multiple versions of a pickup truck bed tonneau cover according to claim 10, further comprising:

providing the universal cross-section outer frame rail stock with a universal seal coupling channel;

for each of the multiple versions of the tonneau cover, providing each of a large seal member, a small seal member, and a transition seal member with a cooperating universal seal coupling member, for each of the multiple versions of the tonneau cover, coupling the large seal member to the universal seal coupling channel to accommodate large gaps adjacent the tonneau cover, for each of the multiple versions of the tonneau cover, coupling the small seal member to the universal seal coupling channel to accommodate small gaps adjacent the tonneau cover, and for the multiple versions of the tonneau cover, coupling the transition seal member to the universal seal coupling channel to transition between the large seal member and the small seal member;

thereby creating a complete perimeter seal for each of the multiple versions of the tonneau cover.

18. The method of manufacturing multiple versions of a pickup truck bed tonneau cover according to claim 10, further comprising:

providing the universal cross-section outer frame rail stock with an outer side cover edge receiving channel adjacent an outer side cover retention slot;

for each of the multiple versions of the tonneau cover, inserting an edge of a plastic coupling member of a flexible textile cover into the edge receiving channel and rotating the plastic coupling member to insert a barb-like member of the plastic coupling member into the cover retention slot of the front, rear, and side frame rail members.

19. A pickup truck bed tonneau cover manufactured from universal components comprising:

an outer frame comprising a front rail, a rear rail and a plurality of side rails, and all of the front rail, the rear rail and the side rail members of the pickup bed tonneau cover having a same universal frame rail cross-section throughout their length;

a front pair and a rear pair of corner brackets, each corner bracket comprising first and second universal corner bracket members configured to be coupled together in different fixed positions to form one of a plurality of potential angles, the potential angles including both greater than and less than 90 degrees;

each of the front pair of corner brackets being coupled to the front rail and an adjacent one of the side rail members, and each of the rear pair of corner brackets being coupled to the rear rail and an adjacent one of the side rails;

a plurality of intermediate rails spanning between the side rail members, and all intermediate rails of the pickup bed tonneau cover having a uniform intermediate rail cross-section throughout their length;

a universal intermediate rail bracket coupled to each side rail and providing opposing pairs of the universal intermediate rail brackets, the universal intermediate rail brackets being configured to be coupled to opposing ends of each intermediate rail at any of a corresponding plurality of potential angles; and a universal latch assembly to each of four universal intermediate rail brackets to create all latches of the tonneau cover.

20. The pickup truck bed tonneau cover according to claim 19, further comprising:

a universal hinge bracket member coupled to ends of the side rails to create an opposing pair of universal hinge brackets for each hinge of the tonneau cover;

each opposing pair of universal hinge brackets coupled together with a hinge member configured to allow rotation of the tonneau cover along a hinge line extending at any of the plurality of potential angular positions relative to the side rail members.

21. The pickup truck bed tonneau cover according to claim 20, wherein each hinge member is one of two universal hinge members creating all hinges of the tonneau cover.

22. The pickup truck bed tonneau cover according to claim 20, wherein the universal frame rail cross-section provides a side fastener retention channel throughout the length of an inner side of the front rail, the rear rail, and the side rail members; and wherein a coupling of each of the first and second corner bracket members, and of each of the intermediate rail brackets, and of each of the hinge brackets to the outer frame comprises a head of a threaded fastener being retained within the fastener retention channel.

23. The pickup truck bed tonneau cover according to claim 22, wherein the universal frame rail cross-section includes an unthreaded end fastener retention channel along the entire length of the front rail, the rear rail, and the side rail members; and wherein a coupling of each of the first and second corner bracket members, and of each of the hinge brackets to the outer frame comprises a threaded fastener extending through an aperture in an end flange with a thread of the threaded fastener biting into the unthreaded end fastener retention channel.

24. The pickup truck bed tonneau cover according to claim 20, wherein the universal frame rail cross-section includes an unthreaded end fastener retention channel along the entire length of the front rail, the rear rail, and the side rail members; and wherein a coupling of each of the first and second corner bracket members, and of each of the hinge brackets to the outer frame comprises a threaded fastener extending through an aperture in an end flange with a thread of the threaded fastener biting into the unthreaded end fastener retention channel.

25. The pickup truck bed tonneau cover according to claim 19, wherein the universal frame rail cross-section comprises a universal seal retention channel; and further comprising a large seal member, a small seal member and a transition seal member, each comprising a universal cooperating seal coupling; wherein the universal cooperating seal coupling of the large seal member is retained within the universal seal retention channel adjacent large gaps between the tonneau cover and a perimeter of the pickup-truck, the universal cooperating seal coupling of the small seal member is retained within the universal seal retention channel adjacent small gaps between the tonneau cover and a perimeter of the pickup-truck, and the universal cooperating seal coupling of the transition seal member is retained within the universal seal retention channel at transitions between the large seal member and the small seal member, thereby creating a complete perimeter seal for the tonneau cover.

26. The pickup truck bed tonneau cover according to claim 19, wherein an outer side of the universal frame rail cross-section comprises a cover edge receiving channel adjacent a cover retention slot; and an edge of a plastic coupling member of a flexible textile cover extends into the edge receiving channel and a barb-like member of the plastic coupling member extends into and is retained by the cover retention slot.

27. A pickup truck bed tonneau cover comprising:

a plurality of outer rails each having a uniform cross-section throughout its length, the plurality of outer rails being joined together via hinges and corner brackets to form an outer frame of the pickup truck bed tonneau cover;

the uniform cross-section of the outer rails defining, along the entire length of the outer rail, an elongated seal coupling channel and an elongated step adjacent to, and protruding downwardly beyond, the seal coupling channel;

a compressible seal member coupled to the outer rails via the seal member coupling extending throughout the length of the outer rails; the compressible seal member having a non-compressed state in which the distal portion of the compressible seal member extends downwardly past the adjacent elongated step;

wherein, when pickup truck bed tonneau cover is mounted over a perimeter of a corresponding pickup truck bed, the downwardly protruding elongated step member acts as a continuous elongated stop when it contacts against the perimeter to limit compression of the compressible seal member.

28. The pickup truck bed tonneau cover according to claim 27, wherein the perimeter comprises a plastic cover member over a metal frame, and the downwardly protruding elongated step member contacts against the plastic cover member.

29. The pickup truck bed tonneau cover according to claim 27, wherein the seal member coupling having a barb-like shape.

30. The pickup truck bed tonneau cover according to claim 27, wherein the downwardly protruding elongated step member contacts against the perimeter during normal static loading.

31. The pickup truck bed tonneau cover according to claim 27, wherein the downwardly protruding elongated step member is spaced from the perimeter during normal static loading, and contacts against the perimeter under a dynamic or under an external downward loading on the tonneau cover.

32. The pickup truck bed tonneau cover according to claim 27, wherein the uniform cross-section further comprises a cover coupling slot, a flexible textile cover extends over the outer rails, a plastic coupling member is coupled to a perimeter of the flexible textile cover, the plastic coupling member having a cooperating coupling protrusion extending into the cover coupling slot to couple the flexible textile cover to the outer frame.

33. The pickup truck bed tonneau cover according to claim 32, wherein the uniform cross-section further comprises an edge receiving slot, and the plastic coupling member further comprises a bent extension along its upper edge, wherein the bent extension extends into the edge receiving slot, thereby locating the cooperating coupling protrusion in alignment with the cover coupling slot.

\* \* \* \* \*

UNITED STATES PATENT AND TRADEMARK OFFICE
CERTIFICATE OF CORRECTION

PATENT NO. : 8,894,127 B2  
APPLICATION NO. : 13/538240  
DATED : November 25, 2014  
INVENTOR(S) : Bradley R. Garska Page 1 of 1

It is certified that error appears in the above-identified patent and that said Letters Patent is hereby corrected as shown below:

In the Specification:

Column 7, lines 28-29;
  "cross-car" should be --cross bar--.

In the Claims:

Column 14, line 32;
  ";" should be --,--.

Signed and Sealed this  
Ninth Day of June, 2015

Michelle K. Lee  
*Director of the United States Patent and Trademark Office*